Aug. 17, 1965   T. B. DALTON   3,201,086
NO-BACK DEVICE FOR SEMI-TRAILER LANDING GEAR LEGS AND THE LIKE
Filed Feb. 28, 1963   3 Sheets-Sheet 1

INVENTOR.
THOMAS B. DALTON
BY
Barnes, Kisselle, Raisch & Choate
ATTORNEYS

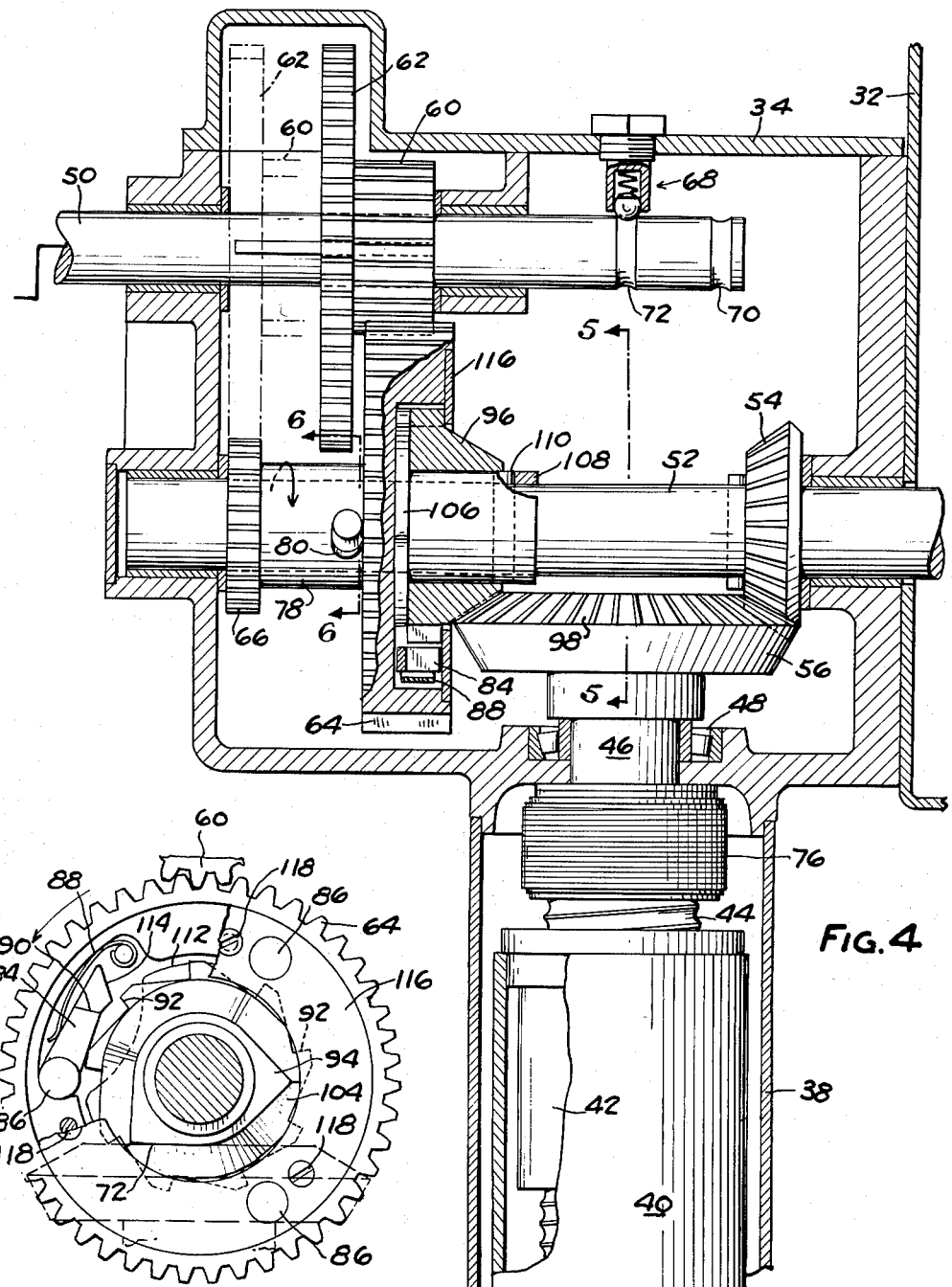

Aug. 17, 1965   T. B. DALTON   3,201,086
NO-BACK DEVICE FOR SEMI-TRAILER LANDING GEAR LEGS AND THE LIKE
Filed Feb. 28, 1963   3 Sheets-Sheet 3

INVENTOR.
THOMAS B. DALTON
BY
Barnes, Kisselle, Raisch & Choate
ATTORNEYS

United States Patent Office 3,201,086
Patented Aug. 17, 1965

3,201,086
NO-BACK DEVICE FOR SEMI-TRAILER LANDING GEAR LEGS AND THE LIKE
Thomas B. Dalton, Muskegon, Mich., assignor to Westran Corporation, Muskegon, Mich., a corporation of Michigan
Filed Feb. 28, 1963, Ser. No. 261,625
18 Claims. (Cl. 254—86)

This invention relates to a device for preventing the retraction or retrograde operation of the jackscrew mechanism of a semi-trailer landing gear leg under the weight of the vehicle on it.

Conventional landing gear legs for semi-trailers have telescoping leg sections which are extended for assuming the weight of the forward end of the trailer by means of a jackscrew and recirculating ball type nut. The jackscrew and nut structure is so efficient that without some restraining force it would quickly run down under the weight of the trailer. These legs are therefore usually provided with a clutch or brake which resists weight-induced retracting or retrograde operation of the jackscrew. This resistance is overcome by intentional leg-retracting operation of the mechanism.

If the brake or clutch should fail while the operator is manually retracting the jackscrew mechanism, a great deal of force is suddenly transmitted through the mechanism to the operator's hands. This force is sufficient to injure the operator seriously before he can let go of the operating crank. Moreover, once he has let go of the crank, it spins around rapidly while the jackscrew is retracting. If the operator should fall into the path of the crank, he could be further seriously injured.

Previously, no-back devices have been provided on landing gear legs of this type; but in each case, a certain amount of motion is transmitted to the operating handle before the no-back device engages to halt further retraction of the leg. This motion, even though small, is sudden and capable of injuring the operator before he can let go of the crank.

The object of this invention is to provide a relatively simple, inexpensive no-back structure which engages without transmitting any retrograde force to the operating handle while the operator is retracting the leg structure. It is also an object of the invention to provide such a structure in which the components can be interchangeably used with components in a conventional operating mechanism for a semi-trailer jackscrew.

Generally, the invention contemplates a pawl and ratchet no-back clutch in which the ratchet is carried by a shaft and the pawls by an adjacent gear. A lost-motion connection is provided between the shaft and gear through which the clutch is conditioned for engagement by initial leg-retracting movement of the operating mechanism. The ratchet is arranged to rock into abutting engagement with an adjacent bevel gear in the mechanism. When the shaft overruns the gear, upon failure of the conventional brake or clutch, the pawls engage the ratchet responsive to the lost motion between the shaft and gear, thereby immediately halting retrograde operation of the mechanism. The mechanism halts before any retrograde force is transmitted to the operating handle. One form of the invention is shown in the accompanying drawings.

FIG. 4 is an enlarged generally sectional view on line 4—4 of FIG. 1.

FIG. 5 is generally a sectional view on line 5—5 of FIG. 4.

Figure 1:
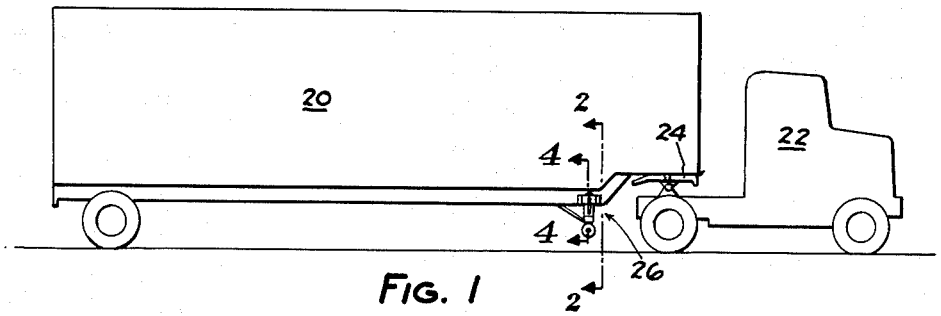
FIG. 1 is a diagrammatic side elevational view of a tractor and semi-trailer incorporating a landing gear according to this invention.

Shown in the drawings is a semi-trailer 20 coupled to a tractor 22 through a fifth wheel 24. Landing gear 26, incorporating a no-back structure according to this invention, is mounted adjacent the front end of the semi-trailer rearwardly of fifth wheel 24. The landing gear includes legs 28 and 30 secured to frame members 32 of the semi-trailer through heads 34 and 36 respectively. Each leg has an upper leg tube 38 secured to its head and a lower inner leg tube 40 which telescopes between a downward, load-bearing position as shown in solid lines in FIG. 2 and an upward retracted position as shown in FIG. 1 and in dotted lines in FIG. 2.

Figure 2:
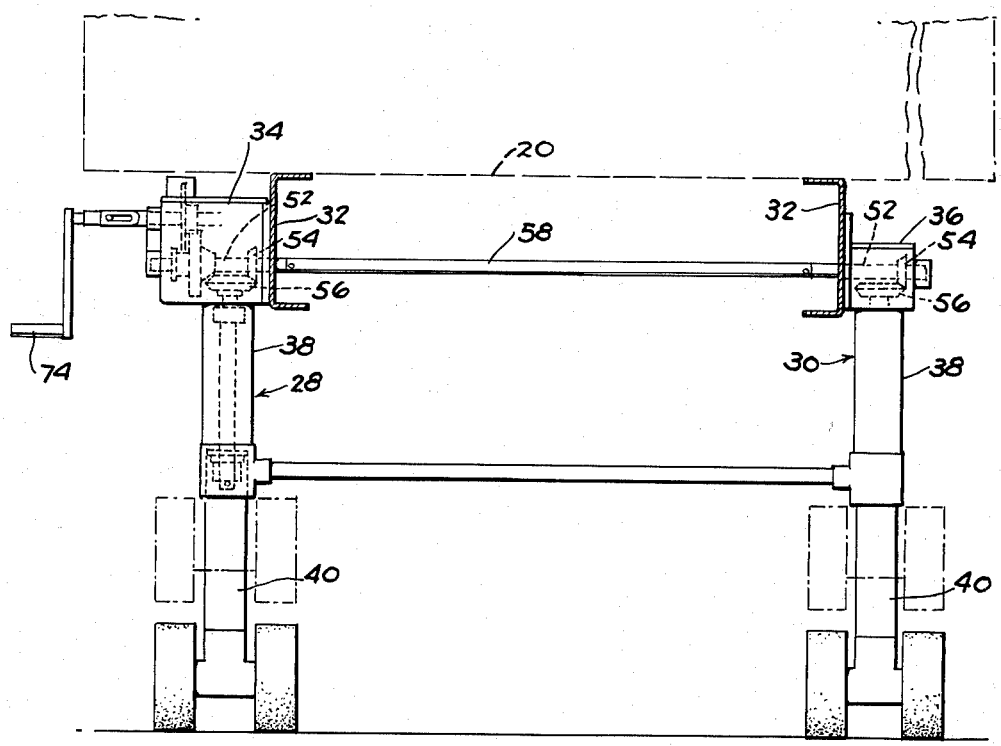
FIG. 2 is an enlarged partly diagrammatic sectional view on line 2—2 of FIG. 1.
Figure 3:
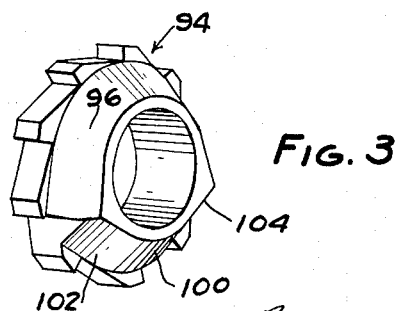
FIG. 3 is an enlarged perspective view of a ratchet element used in the no-back structure.

The lower leg tube carries a recirculating ball type nut 42 engaged with a jackscrew 44 having an upper shaft portion 46 journaled on its respective head 34, 36 as at 48 (FIG. 4). The jackscrew is operated by means of a drive shaft 50 through reduction gearing contained in head 34 and a shaft 52 which carries bevel gears 54 drivingly engaged with bevel gears 56 at the top ends of the jackscrews. Shafts 52 are interconnected by a shaft 58 (FIG. 2).

The illustrated reduction gearing in head 34 is conventional in that shaft 50 carries a small diameter gear 60 and a larger diameter gear 62 selectively engageable respectively with a large gear 64 and a small gear 66 on shaft 52 by axially shifting shaft 50 between the solid- and dotted-line positions of FIG. 4 wherein it is yieldably secured in place by a spring-pressed ball detent 68 engaged in one of grooves 70 and 72. Shaft 50 is usually manually powered by means of a crank 74, but other motor means may be utilized.

Jackscrew 44 is provided with a clutch 76 which releases when the jackscrew is turned in the direction for extending legs 28, 30 downwardly for assuming the weight of the trailer. The clutch engages responsive to slight movement in the leg-retracting direction and thereby prevents load-induced retrograde operation of the jackscrew. However, the restraint of the clutch is overcome by leg-retracting operation of shaft 50. The clutch illustrated is of the coil spring type.

In accordance with the invention, a lost-motion driving connection is provided between gear 64 and shaft 52. For this purpose, gear 64 is shown as being provided with a sleeve 78 rockably disposed around shaft 52 and having diametrically oppositely disposed slots 80 which are elongate in a circumferential direction. Shaft 52 has a diametrically extending pin whose ends 82 project into slots 80. Gear 66 is also mounted on sleeve 78.

A plurality of pawls 84 are pivotally mounted on gear 64 as at 86. These pawls are biased radially inwardly by leaf springs 88 so that a shoulder 90 on each pawl will engage a tooth 92 on a ratchet 94 rockably mounted relative to shaft 52. Ratchet 94 has a portion 96 which projects axially beyond gear 64 and over the top bevelled faces of teeth 98 on gear 56. The underside of projection 96 has a central portion 100 configured to remain free of interference with gear 56, thereby permitting rocking movement of the ratchet relative to gear 56.

The end portions 102 and 104 of the underface are bevelled generally complemental to the bevel surfaces of gear teeth 98, and these end portions extend generally radially or tangentially of the ratchet so that they provide lugs which bear against the tops of gear teeth 98 respectively at two rotative positions about 45° apart relative to the axis of shaft 52. This rocking movement facilitates release of the one-way clutch formed by the ratchet and pawl arrangement and facilitates subsequent controlled engagement of the pawls with ratchet teeth 92.

A cam element 106 is substantially non-rotatably mounted on shaft 52, and for this purpose has a sleeve 108 which is pinned to the shaft as at 110. Sleeve 108 provides the actual bearing surface upon which ratchet 94 rocks. Cam 106 has three lobes 112 axially positioned for engagement with fingers 114 at the free ends of pawls 84. Cam lobes 112 restrain pawls 84 from clutching engagement with ratchet 94 in initial leg-retracting movement of gear 64 or 66 as will be explained more in detail below.

Cam 106, pawls 84 and their biasing springs 88, and the ratchet wheel proper of ratchet member 94 are all compacted within recessing contained within the axial extent of gear 64. The parts are secured in place by a retainer plate 116 detachably mounted on gear 64 by bolts or screws 118. Portion 96 of the ratchet element, which projects axially beyond gear 64, is configured so that while cooperating with gear 56 to perform certain functions, it is nevertheless clear of obstruction or engagement with other adjacent portions of a conventional landing gear operating mechanism.

In use, it may be assumed that the landing gear initially is in the upward retracted position of FIG. 1 and dotted lines, FIG. 2. Also, assuming that previously the legs had been retracted in a normal manner, the parts of the no-back structure of this invention will be in the position shown in FIGS. 1, 7, and 9. It may also be assumed that gear 60 is shifted into engagement with gear 64 to provide an advantageous mechanical advantage for extending legs 28 and 30 and assuming the load of trailer 20.

Figure 9:
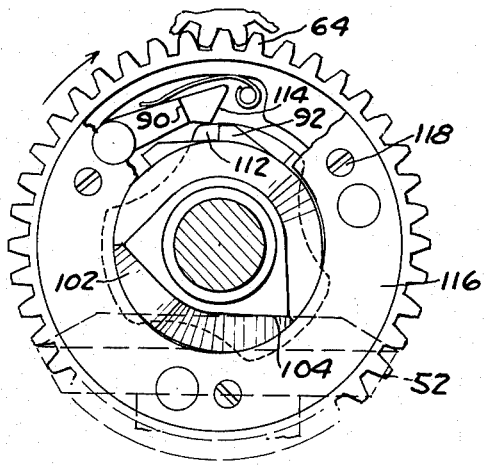
FIGS. 9 and 10 are views generally similar to FIG. 5 but showing the parts in different positions.

Upon initial leg-lowering movement of gear 64, counterclockwise as FIG. 9 is viewed, gear 64 will move independently of shaft 52 which tends to resist rotation because of inherent friction in the system. Finger 114 on each pawl 84 disengages from its respective cam lobe 112 so that each pawl is free to engage ratchet 94 under the action of springs 88. Independent rotation of gear 64 continues until pin ends 82 are engaged by the opposite ends of slots 80 (FIGS. 4 and 6), whereupon shaft 52 and bevel gearing 54, 56 are driven to operate jackscrew 44 and extend leg tube 40 downwardly. During extension of the leg, ratchet 94 is rocked counterclockwise from the FIG. 9 position to the FIG. 5 position as a result of engagement by pawls 84 being carried by gear 64.

Rocking of the ratchet is halted in the FIG. 5 position by engagement of lug 102 against the top of gear 56. Because of its configuration, lug 102 toboggans relative to the top of gear 56 while the latter is rotating. When the leg is fully extended, the parts are in the position shown in solid lines in FIG. 2 and in FIGS. 4, 5, and 6. Clutch 76 normally secures legs 28, 30 in their extended position against the tendency of the weight of the trailer on the legs to rotate the jackscrew mechanism retrograde.

To retract legs 28, 30, it will be assumed that gear 62 has been shifted into engagement with gear 66 to provide advantageous mechanical advantage for rapid retraction. Upon initial retracting movement of gear 66, and therefore of gear 64, gear 64 moves independently of shaft 52 which, through clutch 76 and bevelled gearing 54, 56 is restrained from rotation. In this initial independent movement, pawls 84 are carried clockwise from the FIG. 5 position to the FIG. 9 position while cam 106 remains stationary. Pawl fingers 114 engage cam lobes 112, thereby shifting pawl shoulders 90 radially outwardly so that they are free from engagement with ratchet teeth 92.

Figure 6:
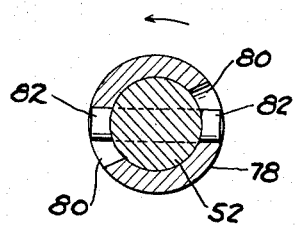
FIG. 6 is a sectional view on line 6—6 of FIG. 4.
Figure 7:
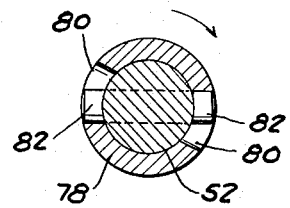
FIG. 7 is a view similar to FIG. 6 but showing the parts in a different position.
Figure 8:
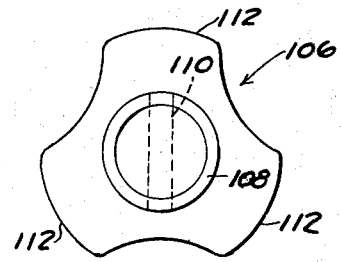
FIG. 8 is generally an end view of a control cam included in the no-back structure.

Independent movement of gear 64 continues until sleeve 78 has rocked through the range of slot 80 from the FIG. 6 position to the FIG. 7 position, whereupon pin ends 82 and shaft 52 are driven in a leg-retracting direction. During leg-retracting movement, ratchet 94 is rocked from the FIG. 5 position clockwise to the FIG. 9 position wherein lug 104 engages against the top of gear 56. Because of its conformation, lug 104 toboggans relative to the top of gear 56 as this gear rotates.

The greatest danger of injury to an operator (or damage to mechanism applying force to shaft 50) occurs during retraction of the leg. At this time, the operator is working against clutch 76; and if clutch 76 should fail, in the absence of a further no-back device, sudden force of considerable magnitude is transmitted through the gearing to shaft 50. The danger is increased because small gear 66 is usually engaged with larger gear 62 while the leg is being retracted and the mechanical advantage of retrograde force exerted by gear 66 is multiplied.

Figure 10:
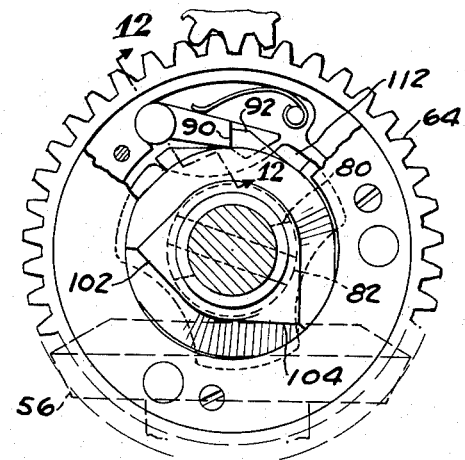
Figure 11:
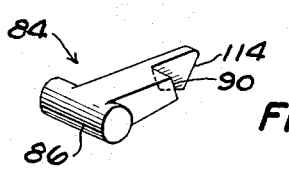
FIG. 11 is a perspective view of a pawl used in the no-back structure.
Figure 12:
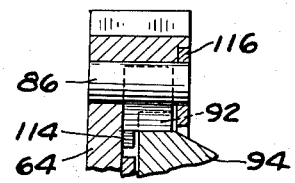
FIG. 12 is a sectional view on line 12—12 of FIG. 10.

When the present invention is incorporated into the structure, the first thing that happens when clutch 76 fails is that shaft 52 overruns sleeve 78 clockwise from the FIG. 7 position to the FIG. 6 position. During this movement, cam lobes 112 are withdrawn from engagement with pawl fingers 114. Springs 88 swing pawls 84 radially inwardly so that pawl shoulders 90 engage ratchet teeth 92 (FIG. 10); and at this time, lug 104 is already engaged against the top of gear 56. Therefore, when pawl shoulders 90 engage the ratchet, further counterclockwise movement of gear 64 is halted and this, in turn, stops retrograde movement of the entire mechanism. Retraction of cam lobes 112 and engagement of the pawls with the ratchet occurs before any retrograde force is transmitted through sleeve 78, gear 66, and gear 62 to shaft 50. Therefore, the operator for shaft 50 is protected completely from injury or damage should clutch 76 fail during leg retraction.

If the leg retracts in the normal manner without any failure of clutch 76, the parts will be in the position of FIG. 9 when the leg is fully retracted. To again extend the leg, shaft 50 is rotated to turn gear 64 counterclockwise and initial independent movement of the gear, as facilitated by lost-motion slots 80, disengages fingers 114 from cam lobes 112 and leg extension continues in the manner described. It will be noted that an important feature of the no-back structure is the rocking mount for ratchet 94. This permits pawl fingers 114 to ride up on cam lobes 12 before lug 104 bottoms against gear 56. Were it not for this rocking movement in the initial movement of pawls 84 toward leg retraction, the pawls would be prevented by engagement with the ratchet teeth from reaching cam lobes 112.

Should clutch 76 fail while the leg structure is extended and the vehicle is left unattended, the mechanism will begin retrograde movement under the weight of the trailer but will be halted as soon as lug 104 engages gear 56 and pawl shoulders 90 engage the ratchet teeth. In actual use of a semi-trailer, there is very little likelihood of injury to an operator at such times and even this likelihood can be eliminated entirely by shifting the reduction gearing to an intermediate disengaged position.

As is brought out above, the entire no-back structure is very compact. The components which provide the no-back feature are interchangeable with components of conventional landing gear operating mechanisms. Thus, the no-back can be installed in existing landing gear as well as included in new manufacture. The device is relatively simple and inexpensive and yet achieves the result of protecting an operator or drive mechanism from injury or damage from sudden retrograde movement of the jackscrew and related components.

I claim:
1. In a landing gear for semi-trailer vehicles and the like having a leg structure and having mechanism operable to move the leg structure between a retracted position and a lowered position in which it supports the weight of the vehicle, improved mechanism which comprises,
a driving element and a driven element,
means providing a lost-motion connection between said elements through which motive force is transmitted to said leg structure,
said lost-motion connection being constructed and arranged to facilitate relative movement of said elements upon reversal of the direction of said motive force,
means providing a clutch having two members, one of which is mounted for movement with one of said elements, the other of said clutch members being mounted for movement in opposite directions toward two positions responsive to relative movement of said elements in opposite directions,
means providing obstruction to movement of said other clutch member beyond said positions,
said elements being movable substantially free of the influence of said obstruction when said clutch members are clutchingly disengaged,
control means operable responsive to relative movement of said elements in one direction to restrain said clutch members from clutching engagement,
said control means being operative responsive to relative movement of said elements in the other direction to release said restraint,
said other direction being the direction in which said driven element tends to overrun said driving element under load on said leg structure,
and means operable responsive to such overrunning to cause clutching engagement of said clutch members,
the range of movement of said other clutch member between said positions thereof being greater than the range of said relative movement of said elements, whereby to insure establishment of said restraint upon relative movement of said elements in said one direction.

2. The mechanism defined in claim 1 wherein said mechanism includes shafting and said other clutch member is mounted for rocking movement relative to said shafting.

3. The mechanism defined in claim 1 wherein said driven element comprises rotatable shaft means, said other clutch member being mounted for rocking movement relative to said shaft means.

4. The mechanism defined in claim 1 wherein said means providing said obstruction comprises lug means on said other clutch member engageable with adjacent portions of said mechanism substantially at said positions of said other clutch member.

5. The mechanism defined in claim 1 wherein said other clutch member is mounted for rocking movement relative to said driven element.

6. The mechanism defined in claim 1 wherein said driving and driven elements comprise rotatable shafting, said other clutch member being mounted for rocking movement relative to the other of said elements, said clutch members including ratchet means and pawl means.

7. The mechanism defined in claim 1 wherein said control means includes means fixed to the other of said elements, the latter-said means being engageable with said one clutch member responsive to relative movement of said elements in said one direction to establish said restraint.

8. The mechanism defined in claim 1 wherein said clutch members are clutchingly disengageable responsive to relative movement of said elements in said other direction under said motive force applied through said driving element.

9. In a landing gear for semi-trailer vehicles and the like having a leg structure and having mechanism operable to move the leg structure between a retracted position and a lowered position in which it supports the weight of the vehicle, improved mechanism which comprises,
a gear element and a shaft element,
means providing a lost-motion connection between said elements through which motive force is transmitted to said leg structure,
said lost-motion connection being constructed and arranged to facilitate relative movement of said elements upon reversal of the direction of said motive force,
a clutch having a ratchet member and a pawl member, one of which is mounted for movement with one of said elements,
the other of said clutch members being mounted for rocking movement in opposite directions toward two positions responsive to relative movement of said elements in opposite directions,
means providing obstruction to movement of said other clutch member beyond said positions,
said elements being movable substantially free of the influence of said obstruction when said clutch members are clutchingly disengaged,
a clutch control cam mounted on the other of said elements in axial alignment with said pawl member,
said cam being operable responsive to relative movement of said elements in one direction to engage said pawl member and restrain the same from clutching engagement with said ratchet member,
said cam being disengageable from said pawl member responsive to relative movement of said elements in the other direction to release said restraint,
said gear and shaft elements being so constructed and arranged that said shaft element tends to overrun said gear element under load on said leg structure, said other direction being the direction of such overrunning,
and spring means operable responsive to such overrunning to force said pawl member into clutching enengagement with said ratchet member,
the range of rocking movement of said other clutch member between said positions thereof being greater than the range of said relative movement of said elements, whereby to insure interengagement of said control cam and pawl member upon relative movement of said elements in said one direction.

10. The mechanism defined in claim 9 wherein said pawl member is mounted for movement with said gear element, said ratchet member being rockably mounted about said shaft element, said control cam being substantially non-rotatably mounted on said shaft element.

11. The mechanism defined in claim 9 wherein said gear element has an axial extent within which said clutch members and cam are disposed, said ratchet member having an axial projection beyond said extent, said means providing said obstruction comprising lug means on said projection positioned for engagement with adjacent portions of said mechanism.

12. The mechanism defined in claim 11 wherein said gear element has a hollow interior within which said clutch members and cam are disposed and out of which said projection extends.

13. The mechanism defined in claims 10 wherein said mechanism includes in addition a gear drivingly connected with and positioned adjacent said shaft element, said means providing said obstruction comprising lug means on said ratchet member positioned to slidably engage said gear.

14. The mechanism defined in claim 13 wherein said additional gear is a bevelled gear, said lug means having surface portions bevelled generally complementally to the bevelled face of said bevelled gear, said bevelled surface portions being slidably engageable with said bevelled gear face to provide said obstruction.

15. In a landing gear for semi-trailer vehicles and the like having a leg structure and having mechanism operable to move the leg structure between a retracted position and a lowered position in which it supports the weight of the vehicle, said mechanism including a shaft carrying a bevelled gear drivingly engaged with an adjacent bevelled gear and a drive element operable to rotate said shaft, said mechanism also including a clutch having two members which are clutchingly releasable to facilitate lowering of said leg structure and engageable to restrain load-induced retraction of said leg structure, improvement in said mechanism which comprises, means providing a rockable mount for one of said clutch members about the axis of said shaft,
 said one clutch member having angularly displaced lugs with surface portions bevelled generally complementally to the bevel of said adjacent gear,
 said lugs being positioned so that said surface portions thereof slidably engage different portions of said adjacent bevel gear in two different rotative positions of said other clutch member relative to said shaft,
 a lost-motion connection between said drive element and shaft wherein the range of lost motion is less than the range of movement of said other clutch member between said positions,
 clutch control means operable responsive to relative movement of said drive element and shaft in opposite directions respectively to restrain clutching engagement of said clutch members and to release said restraint, the latter direction being that in which said shaft tends to overrun said drive element under load on said leg structure,
 and means operable responsive to such overrunning to cause clutching engagement of said clutch members so that said one clutch member by engagement with said adjacent bevelled gear halts leg-retracting movement of said mechanism.

16. The mechanism defined in claim 15 wherein said clutch members comprise a ratchet member and a pawl member, said ratchet member comprising said one clutch member.

17. The mechanism defined in claim 16 wherein said pawl member is mounted for movement with said driving element.

18. In a landing gear for semi-trailer vehicles and the like having a leg structure and having mechanism operable to move said leg structure between a retracted position and a lowered position in which it supports the weight of the vehicle, said mechanism including a pack-screw and nut combination operated by a shaft which carries a bevelled gear drivingly engaged with an adjacent bevelled gear, and reduction gearing operably connected with said shaft, a brake being provided which releases to facilitate leg-lowering movement and engages to resist vehicle-weight-induced leg-retraction movement, said brake being yieldable to leg-retracting operation of said shaft and bevelled gearing by said reduction gearing, means operable to prevent vehicle-weight-induced retraction of said leg structure upon failure of said brake, said means comprising, means forming a lost-motion connection between said shaft and a reduction gear in said reduction gearing,
 ratchet means rockably mounted on said shaft,
 said ratchet means having lugs which extend laterally of said shaft and which have bevelled surfaces generally complemental to the bevel face of said adjacent bevelled gear,
 said lugs bearing respectively against angularly displaced portions of said gear face, thereby providing stops to rocking movement of said ratchet means respectively in a first and second position,
 said ratchet means being movable in opposite directions toward said positions responsive to relative movement of said reduction gear and shaft in opposite directions,
 said reduction gear and shaft being rotatable substantially free of the influence of said stops when said pawl and ratchet means are clutchingly disengaged,
 cam means mounted substantially non-rotatably on said shaft in alignment with said pawl means,
 said cam means, responsive to relative movement of said reduction gear and shaft in one direction, being operable to engage said pawl means and restrain the same from clutching engagement with said ratchet means,
 said cam means, responsive to relative movement of said reduction gear and shaft in the other direction, being operative to disengage said pawl means and release said restraint,
 said other direction being the direction in which said shaft tends to overrun said reduction gear under load on said leg structure upon failure of said brake,
 and spring means biasing said pawl means toward clutching engagement with said ratchet means,
 the range of movement of said ratchet means between said two positions being greater than the range of said relative movement between said shaft and reduction gear, whereby to insure establishment of said restraint upon relative movement thereof in said one direction.

References Cited by the Examiner
UNITED STATES PATENTS

| | | | |
|---|---|---|---|
| 2,550,801 | 5/51 | Geerds | 192—8 |
| 2,783,861 | 3/57 | Jungles | 192—8 |
| 3,033,522 | 5/62 | McKay | 254—86 |

WILLIAM FELDMAN, *Primary Examiner.*

MILTON S. MEHR, *Examiner.*